No. 691,222.  
F. R. WHITE.  
FASTENER.  
(Application filed Mar. 28, 1901.)  
Patented Jan. 14, 1902.
(No Model.)
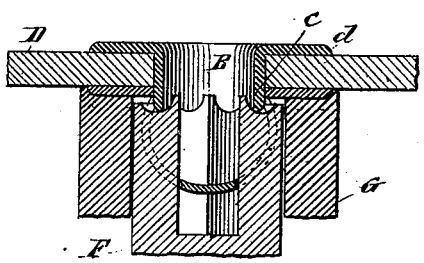
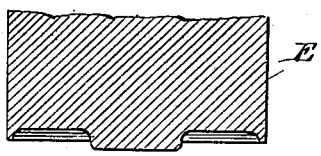
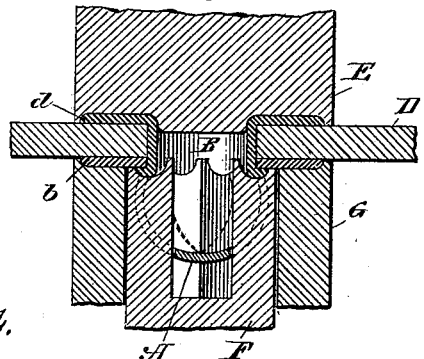
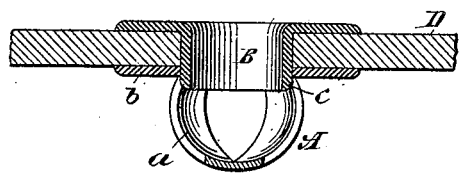
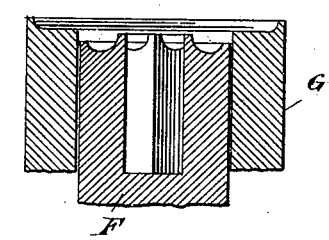
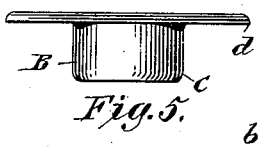
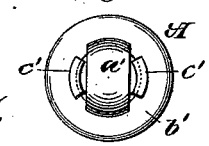
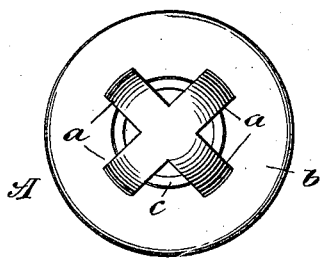
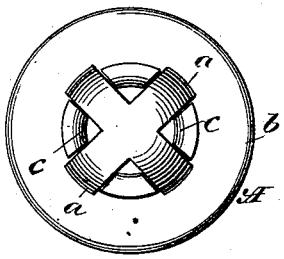
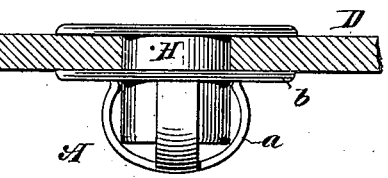
WITNESSES:  
INVENTOR  
Franklin R. White  
BY George Cook  
ATTORNEY

UNITED STATES PATENT OFFICE.

FRANKLIN R. WHITE, OF WATERBURY, CONNECTICUT, ASSIGNOR TO THE PATENT BUTTON COMPANY, OF WATERBURY, CONNECTICUT, A CORPORATION OF CONNECTICUT.

FASTENER.

SPECIFICATION forming part of Letters Patent No. 691,222, dated January 14, 1902.

Application filed March 28, 1901. Serial No. 53,170. (No model.)

*To all whom it may concern:*

Be it known that I, FRANKLIN R. WHITE, a citizen of the United States, and a resident of Waterbury, in the county of New Haven and State of Connecticut, have made and invented certain new and useful Improvements in Fasteners, of which the following is a specification.

My invention relates to an improvement in fasteners, and more particularly to that kind or class thereof generally known and referred to as "ball-and-socket" fasteners adapted for use upon gloves, umbrella-bands, &c. As is well known, the ball member of the fastener now in general use consists of either three or four parts—that is, the slotted ball, button, or "bird-cage," an upsetting-eyelet located within said slotted ball and secured thereto, and an eyelet passing through the fabric and upset within said former eyelet for securing the parts to said fabric, an additional clamping-ring being sometimes used for securing the slotted ball and upsetting-eyelet together.

The object of my invention is to so construct and arrange these parts that said clamping-ring and upsetting-eyelet may be dispensed with, the slotted ball, button, or bird-cage and the fastening-eyelet or hollow rivet forming the complete ball member of the fastener, thereby materially reducing the cost of the fastener and time and labor in assembling the parts.

With these and other ends in view my invention consists in certain novel features of construction and combinations of parts, as will be hereinafter fully described, and pointed out in the claims.

In the accompanying drawings, Figure 1 represents my improved fastener prior to securing the several parts to the cloth or fabric, the same and fastening-dies being shown in section. Figs. 2 and 3 are sectional views showing, respectively, the dies in their several positions prior to and after securing the fastener in place. Fig. 4 is a view of the fastening-eyelet or hollow rivet; and Fig. 5, a view of the slotted ball, button, or bird-cage. Fig. 6 is a plan view of the fastening-eyelet or hollow rivet and spring-ball prior to being secured together, and Fig. 7 a similar view of the two parts after being secured. Figs. 8 and 9 are views of modifications.

Referring to the drawings, A represents a spring stud, ball, or button, and consists of the radial fingers $a$ and the flange $b$, the fingers being two or more in number, as desired, the stud being more or less depressed, as shown in Fig. 5, or more nearly spherical, as shown in Fig. 1.

B represents the fastening-eyelet or hollow rivet, preferably an open one, and consists of the shank $c$ and flange $d$ and of a diameter to nicely fit within the stud A, as illustrated in Fig. 1, the length of the shank $c$ being such as to extend a short distance into the stud beyond the flange $b$.

In attaching the fastener to cloth or fabric the slotted ball or spring-stud A is placed with the flange $b$ resting against the material D and the fastening-eyelet or hollow rivet B forced through the latter or through an opening made in the material until its flange $d$ rests against the opposite surface of said material. By means of suitable tools or dies those portions of the shank of the fastening-eyelet or hollow rivet between the fingers $a$ are swaged or upset until they are turned over and upon the flange $b$ of the stud A, as illustrated in Figs. 3 and 7, thereby securely holding said stud to the material D. This upsetting or swaging of the fastening-eyelet sometimes results in the slitting of the metal of which the shank of the eyelet is made, and at other times the metal simply upsets or folds upon itself and over and upon the flange of the eyelet, the action of the metal under the setting-tools depending largely upon its malleability.

In Fig. 8 I have shown the combined stud and eyelet prior to upsetting the latter, the eyelet H being lengthened to act as a support for the radial fingers $a$ and prevent the same from collapsing or being accidentally crushed. In this instance the eyelet H will be slitted, so that those portions of the shank between the radial fingers may be turned over upon the flange $b$ of the stud, those portions of the shank opposite the radial fingers and not flanged over acting as supports, as before described.

The fastening tools or devices above referred to consist of a die E, which rests against the flange *d* of the fastening-eyelet B and extends slightly within the shank *c* of the same, as illustrated in Fig. 3. The opposing die consists of the rod or plunger F, having its extreme end provided with slots to receive the radial fingers *a* of the stud A when the parts assume the positions as shown in Fig. 3, those portions of the plunger not slotted being adapted to pass between the radial fingers and, striking the edge of the shank of the fastening-eyelet or hollow rivet at those places, crowd the metal upon itself, and thereby turn such portions of the shank of the fastening-eyelet or hollow rivet over and upon the flange *b* of the stud, as before described. Around the plunger F fits a collar G, which rests upon the flange *b* of the stud, said collar being preferably arranged to allow of a reciprocal movement of the plunger F within it. It will of course be understood that the end of the plunger F will be slotted in accordance with the number of radial fingers *a*, as the stud A may be made with two, four, six, or more fingers, the purpose of the plunger being to allow these fingers to be received within it and those portions of said plunger not slotted to pass in between said fingers and cut and upset or swage the edge of the fastening-eyelet down upon the flange *b* of said stud.

Again in Fig. 9 I have shown a top plan view of the fastener wherein the opposite sides or portions of the spring-stud are cut away, leaving the central portion or finger *a'*, the shank of the eyelet being turned over, as at *c'*, upon the flange *b'* of the stud at those places where said stud is cut away.

Having fully described my invention, what I claim as new, and desire to secure by Letters Patent, is—

1. A stud member having an annular base with spaced spring-arms, and a fastener having arms passed from below into the stud-base, and made to respectively brace the lower portion of the stud-arms, and to be bent or clenched through between said stud-arms onto the stud-base, substantially as described.

2. A stud member having a base and resilient arms, with a dome or top all formed integral with one another, and a fastener comprising a base with prongs for engaging the stud likewise formed integral with one another, so that the entire device comprises no more than two pieces, substantially as described.

3. A spring stud or button slotted to form fingers or sections and provided with a base or flange, combined with a fastening-eyelet, the shank of which extends into said stud and is upset upon the flange thereof between the fingers or sections, substantially as described.

4. The ball member of a ball-and-socket fastener, consisting of two parts, namely, a spring stud or button and a fastening-eyelet, said stud consisting of an annular base or flange and sectional or radial fingers, said eyelet consisting of a flange and shank, the shank being adapted to be inserted within said stud and having portions thereof turned over on the flange of said eyelet between said fingers, substantially as described.

Signed at Waterbury, in the county of New Haven and State of Connecticut, this 5th day of March, A. D. 1901.

FRANKLIN R. WHITE.

Witnesses:
JAY H. HART,
K. A. RUBEY.